Jan. 15, 1935.  F. E. WEILAND  1,988,182
DUAL SPEED AXLE GEARING
Filed July 1, 1933   5 Sheets-Sheet 1
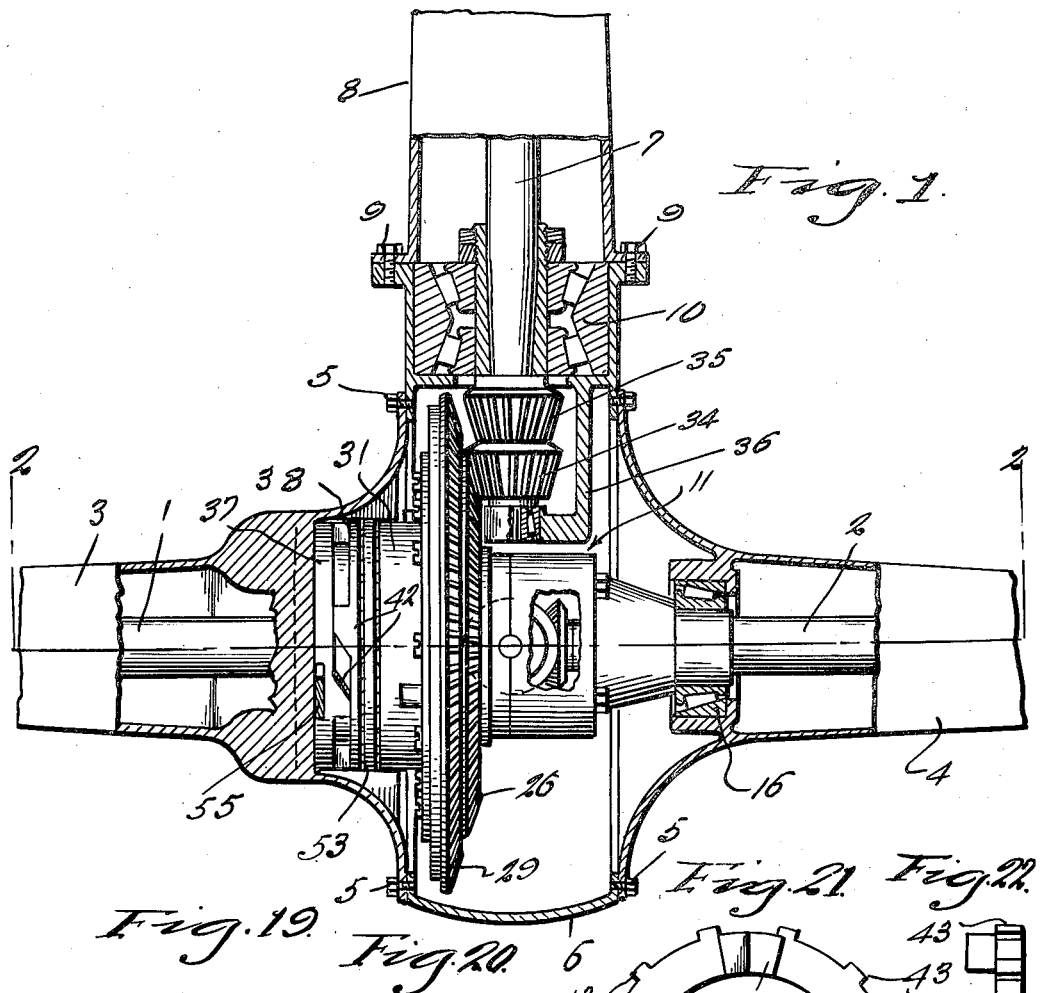
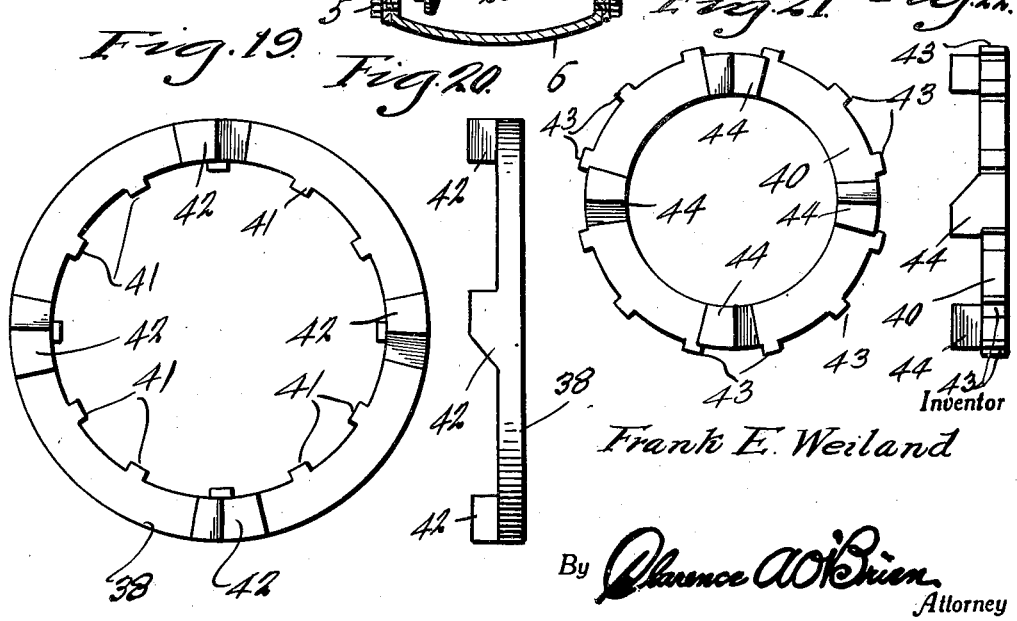
Inventor
Frank E. Weiland
By Clarence A. O'Brien
Attorney Jan. 15, 1935.  F. E. WEILAND  1,988,182
DUAL SPEED AXLE GEARING
Filed July 1, 1933  5 Sheets—Sheet 2
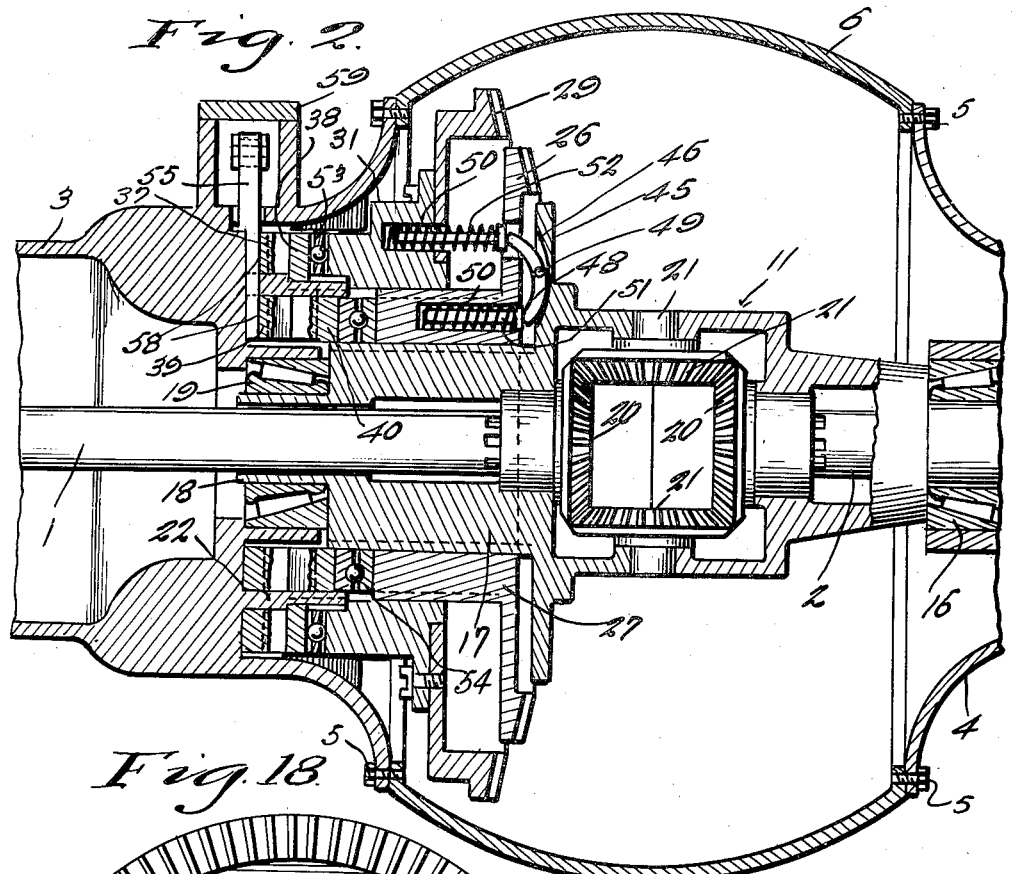
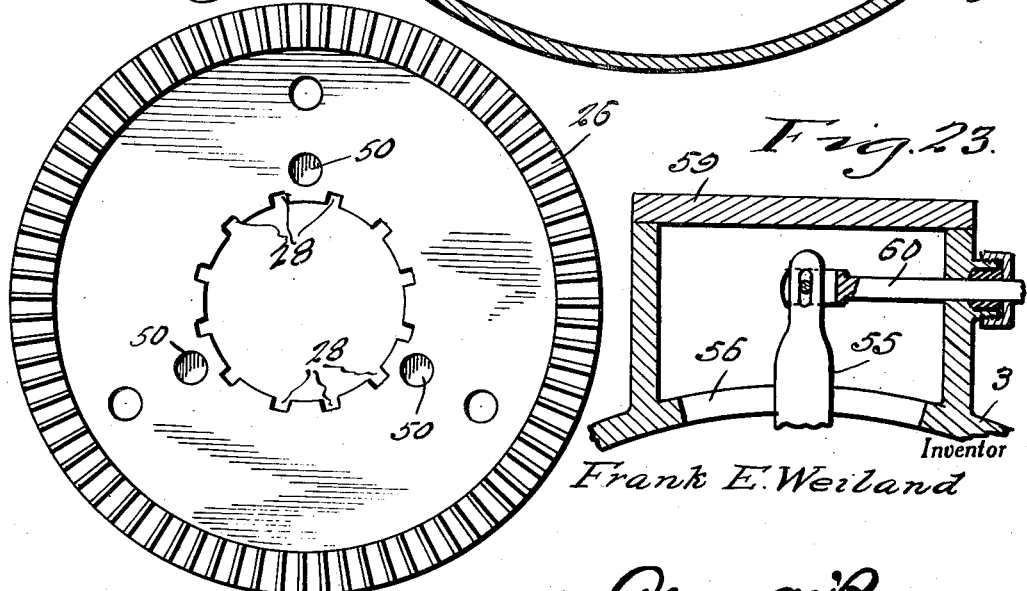
Inventor
Frank E. Weiland
By Clarence A. O'Brien
Attorney Jan. 15, 1935.　　　F. E. WEILAND　　　1,988,182
DUAL SPEED AXLE GEARING
Filed July 1, 1933　　　5 Sheets-Sheet 3
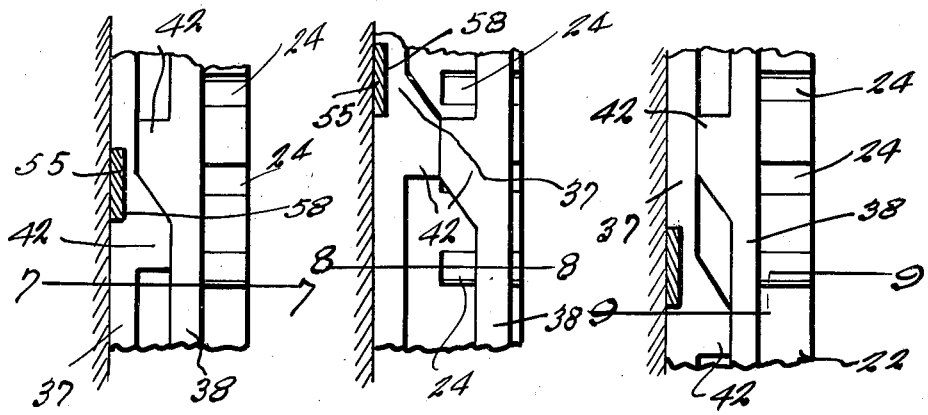
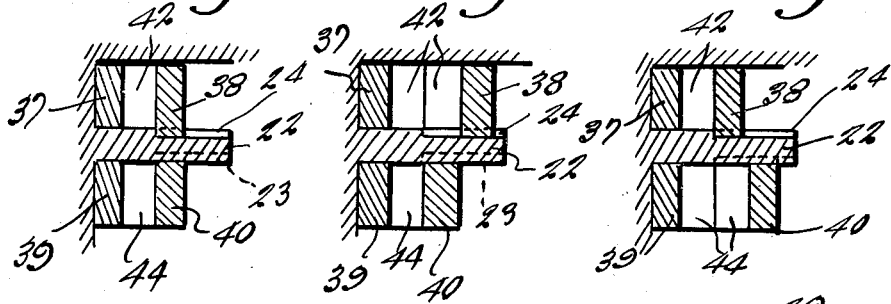
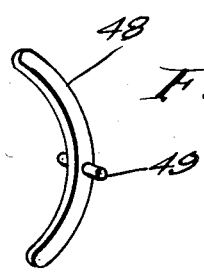
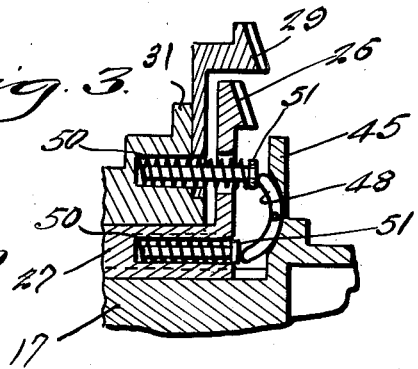
Inventor
Frank E. Weiland
By Clarence A. O'Brien
Attorney

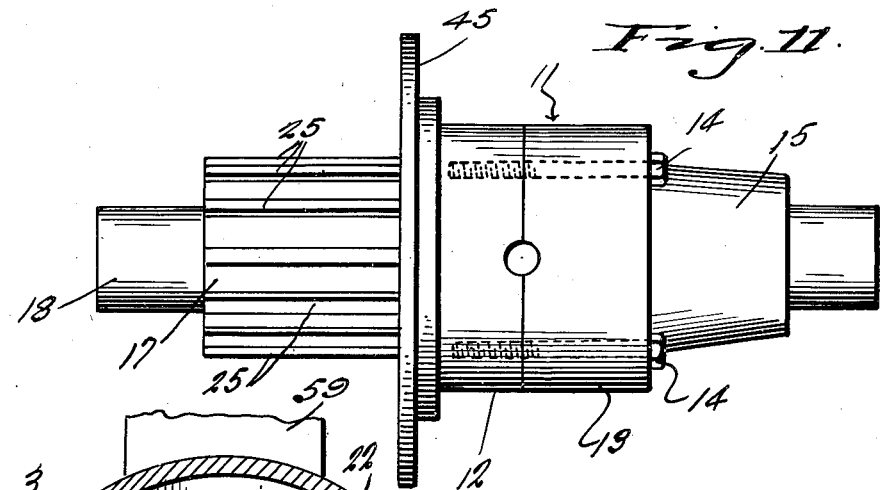
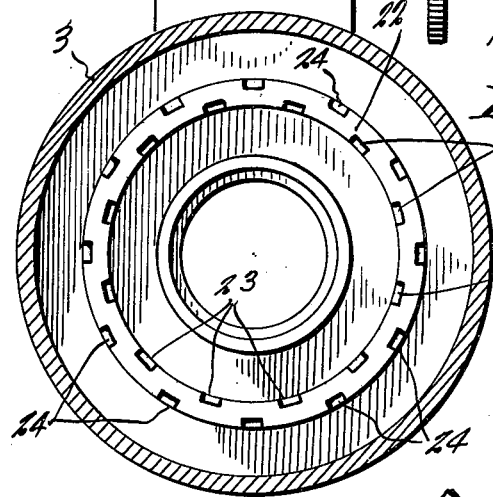
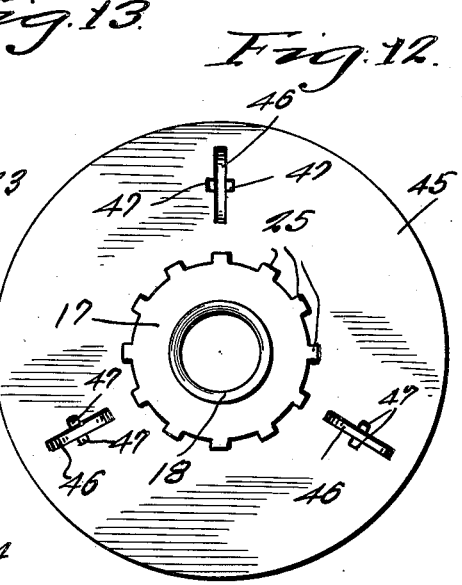
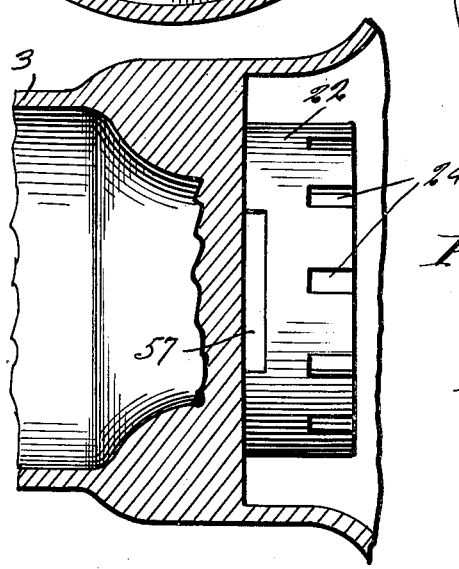

Jan. 15, 1935.    F. E. WEILAND    1,988,182
DUAL SPEED AXLE GEARING
Filed July 1, 1933    5 Sheets-Sheet 5

Inventor
Frank E. Weiland

By Clarence A. O'Brien
Attorney

Patented Jan. 15, 1935

1,988,182

UNITED STATES PATENT OFFICE 1,988,182

DUAL SPEED AXLE GEARING

Frank E. Weiland, West Palm Beach, Fla., assignor of one-half to Joe Hatfield, Huntington, W. Va.

Application July 1, 1933, Serial No. 678,669

5 Claims. (Cl. 74—347)

This invention relates to a gearing construction particularly adapted for motor vehicle use and one which may be termed a dual or two-speed axle gear drive to drive the rear axle from the drive shaft at two different speeds relative to the drive shaft.

It is a primary object of the present invention to provide a greatly simplified two-speed axle gearing construction, one in which the absence of cumbersome or unsightly parts is conspicuous, and one teaching in a high degree the solution of the problem of making devices of this character practical and workable in a manner far and above the province and skill of the expert designer.

The invention together with its numerous objects and advantages will be best understood from a study of the following description taken in connection with the accompanying drawings wherein is illustrated a preferred embodiment of the invention.

It is to be understood at the outset that the invention as defined in the appended claims is to be limited to the precise details of construction, combination and arrangement of elements as herein illustrated and described, only to the extent defined by the scope of the appended claims and the requirement of the prior art.

In the drawings:

Figure 1 is a fragmentary horizontal section through the differential housing and the adjacent portions of the rear axle housing and driving shaft housing, illustrating the application of the invention.

Figure 2 is a vertical section taken substantially on the line 2—2 of Figure 1.

Figure 3 is a fragmentary enlarged sectional view showing the association of the two ring gears forming part of the construction.

Figures 4, 5 and 6 are views illustrating somewhat diagrammatically various relative positions assumed by the cam rings, forming part of the construction, at various stages in the operation of the invention.

Figures 7, 8 and 9 are sectional views taken respectively on the lines 7—7, 8—8 and 9—9 respectively of Figures 4, 5 and 6.

Figure 10 is a perspective view of a lever to be hereinafter more fully referred to.

Figure 11 is a plan view of a differential casing constructed in accordance with the present invention.

Figure 12 is an end elevational view of the differential casing.

Figure 13 is a transverse section through one end of one of the housings for a part of the rear axle.

Figure 14 is a fragmentary vertical section through said rear axle part housing shown in Figure 3.

Figure 15:
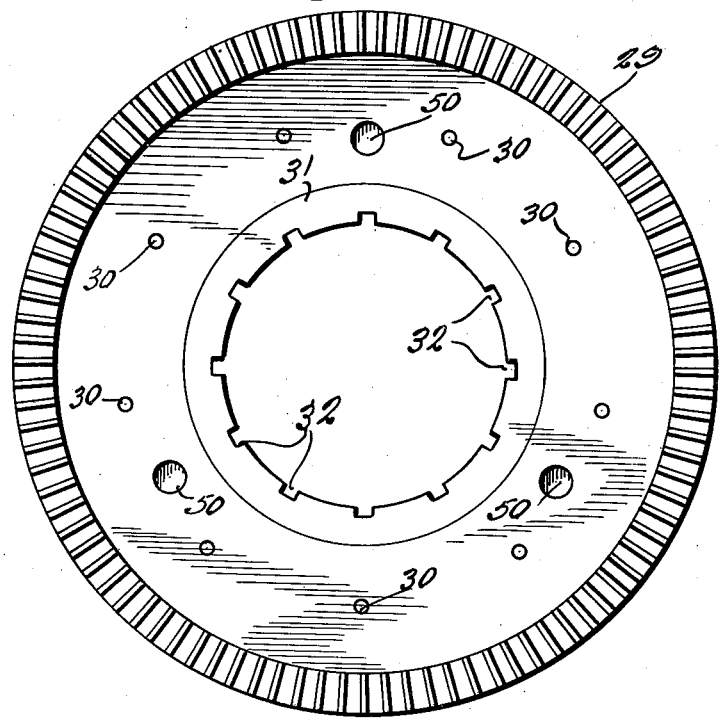

Figure 15 is a face view of the high speed gear forming part of the construction.

Figure 16:
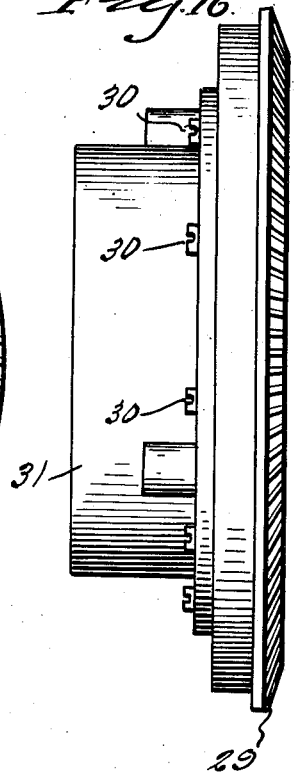

Figure 16 is a side elevational view of the gear shown in Figure 15.

Figure 17:
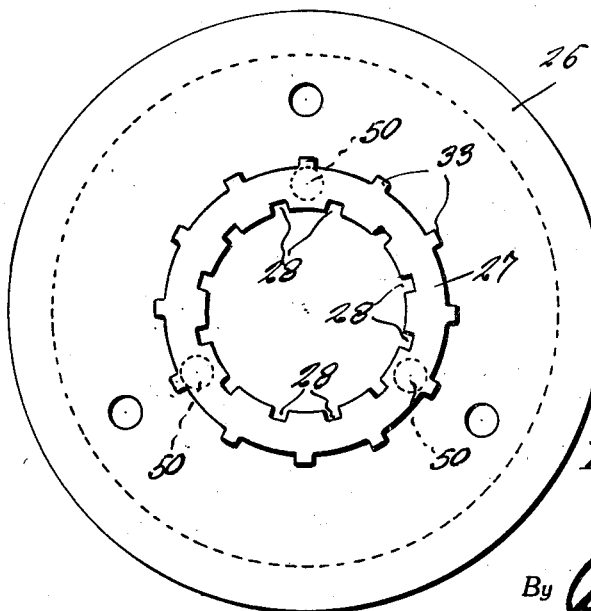

Figure 17 is a rear elevation of the low speed ring gear.

Figure 18 is a face view of the low speed ring gear.

Figure 19 is a face view of a cam ring to be hereinafter more fully referred to.

Figure 20 is an edge elevational view thereof.

Figure 21 is a face view of a second cam ring to be hereinafter more fully referred to.

Figure 22 is an edge elevational view of the second cam ring and

Figure 23 is a fragmentary view partly in section and partly in elevation showing a lever housing and part of the mechanism for shifting high and low speed gears.

Referring to the drawings by reference numerals the rear axle sections or parts 1, 2, which at their ends effect a driving of a pair of vehicle wheels in the usual manner, are journalled in axle housings 3, 4 which latter at one end are secured as at 5 to the differential housing 6. The drive shaft is indicated by the reference numeral 7 and is arranged in a housing 8 connected as at 9 to the differential housing 6. An end portion of the drive shaft 7 is journalled in a suitable bearing 10 while the end portions of the axle shaft sections 1, 2 extend into a differential casing 11 from opposite ends of said casing.

In accordance with the present invention the differential casing 11 is divided transversely into two sections 12, 13 secured together by bolts 14. The section 13 has an end portion 15 journalled in a bearing 16 provided in the axle housing section 4 and accommodating one end of the axle section 2. The differential casing section 12 is provided with a hub portion 17 having an end 18 journalled in a bearing 19 provided therefor in the enlarged end of the axle housing section 3. Hub 17 and extension 18 accommodate one end of the axle section 1 as shown in Figure 2. On the adjacent ends of the axle sections 1, 2, are beveled pinions 20 meshing with beveled pinions 21 loosely mounted on the peripheral wall of the differential casing 11. For the most part this is a common differential gearing construction.

In accordance with the present invention the axle housing section 3 at its enlarged end is provided internally with a fixed drum or annulus 22 provided with internal ways 23 and external ways 24. The hub 17 of the differential case 11 is also provided with keys 25. A low speed ring gear 26 is provided with a hub 27 having internal ways 28 with which are engaged the keys 25 on the hub 17 whereby the gear 26 is mounted on the hub 17 to rotate therewith and to shift axially relative to the hub.

A high speed ring gear 29 is secured by fastening means 30 to a hub 31 provided with internal ways 32 cooperating with keys 33 provided externally on the hub 27 of the gear 26 whereby the gears 26 and 29 are so mounted and interengaged as to rotate with each other while at the same time being free to shift axially relative to one another in relatively opposite directions.

The gears 26 and 29 are adapted to be moved into and out of engagement with pinions 34, 35 mounted on the drive shaft 7 to rotate therewith, the end of the shaft 7 carrying the pinions 34, 35 being suitably supported and journalled in a bearing bracket 36 provided within the differential housing 6.

Means is provided for shifting the gears 26, 29 relative to one another into and out of mesh with the pinions 34, 35 and in the present instance such means consists of a pair of rings 37, 38 arranged concentrically of the drum or annulus 22 and provided for shifting the gear 29, together with a second pair of rings 39, 40 arranged interiorly of the drum or annulus 22 and provided for shifting the gear 26.

Of the first mentioned pair of rings, ring 38 is provided with keys 41 operating in the ways 24 provided on the drum 22 and is consequently constrained to shift axially of the drum; while the ring 37 is mounted on the drum 22 for angular or rotative movement relative thereto. At their confronting faces the rings 37, 38 are provided with cams 42 coacting in a manner clear from a study of Figures 4 to 9 inclusive for shifting the ring 38 in the direction of the gear 29 upon rotation of the ring 37 for projecting the gear 29 to engage the latter gear with the pinion 35.

Of the second pair of rings, ring 40 is provided on its circumference with keys 43 engaging the ways 23 of the drum 22 while the ring 39 is arranged within the drum 22 to rotate relative thereto. The rings 39 and 40 have on their confronting faces cams 44 coacting to shift the ring 40 toward the gear 26 upon rotation of the ring 39 for the purpose of engaging the gear 26 with its pinion 34.

As will be clear from a study of Figures 19 to 22 cams 42, 44 are reversely arranged so that when the rings 37, 39 are rotated in one direction cam ring 40 will move in one direction, and cam ring 38 will move in a reverse direction so that on the projection of one of the gears, for example the gear 26, gear 29 will be retracted in a manner as will be clear from the following.

At the junction of the differential case 11 and hub 17 there is an integral flange 45 that is provided on one face with a series of radial grooves 46, and at opposite sides of each groove 46 between the ends of the grooves are notches 47. Arcuate levers 48 operate in the grooves 46 and between their respective ends are provided with lateral pins 49 journalled in the notches 47. Each of the gear hubs 17, 31 are provided with sockets 50 in which operate plungers 51 normally projected outwardly with respect to the sockets by springs 52. The outer or headed ends of the plungers 51 are engaged with the ends of the levers 48 in a manner clearly shown in Figure 2. It will thus be seen, that when one of the gears, for example the gear 26 is projected to engage its pinion 34 the plungers 51 associated with said gear are forced inwardly of their sockets 50, the levers 48 are caused to rotate in an anti-clockwise direction, and the springs 52 associated with the plungers operating in the sockets provided on the hub of the gear 29 are permitted to expand and return the gear 29 to a retracted position, or to the position shown in Figure 2.

Between the hub 31 of the gear 29 and ring 38 there is provided a suitable thrust bearing 53 and a thrust bearing 54 is interposed between the end of the hub 27 of the gear 26 and the ring 40.

For rotating the rings 37, 38 to selectively advance or project the gears 26, 29 there is provided a lever 55 operating in a slot 56 provided therefor in the axle housing section 3, a slot 57 provided in the drum 22, and engaging in notches 58 provided in corresponding sides or faces of the rings 37, 39 as will be clear from a study of Figure 2. The upper end of the lever 55 operates in a housing 59 provided on the top side of the axle housing section 3, and at said upper end the lever 55 has a lost motion connection with a control rod 60 forming part of any suitable manually operable control mechanism that may be provided to enable the operator of the automobile to control the dual speed gearing.

From the foregoing description, to those skilled in the art it will readily appear that a high speed is attained when the gear 26 is in mesh with the pinion 34 while a low speed is attained by shifting the gear 26 away from its pinion 34 and placing the gear 29 in mesh with this pinion 35. When gear 26 is in mesh with pinion 34, and shaft 7 driven by the engine, the rear axle is driven through pinion 34 and gear 26 for high speed drive, while when pinion 35 and gear 29 are in mesh the drive of the rear axle is through said pinion 35 and gear 29 for low speed drives.

The above operation may be summarized as follows:

When the cam rings 37, 38, 39 and 40 are in the position shown in Figures 4 and 7 the position of the gears 26, 29 will be neutral, that is the gears will be free of engagement with the pinions 34, 35. To effect an engagement of gear 29 with its pinion 35 the lever 55 is rocked in one direction to bring the cams 42 on the rings 37, 38 into the engaged position shown in Figure 5 to project the gear 29 to engage said gear with its pinion 35. To change the speed the lever 55 is rocked in a reverse direction to arrange the cams on the rings 37, 38 at the relative position shown in Figure 6 and to engage the cams 44 on the rings 39 and 40 so that the relative position of the rings 37, 38, 39 and 40 will be as shown in Figure 9 so that gear 26 will be projected to engage its pinion 34 and the gear 29 will be retracted, the position of the gears being now as shown in Figure 2. To place the parts in neutral position the lever 55 is rocked in a reverse direction from the position shown in Figure 6 to the position shown in Figure 4 and the cam rings will then assume the position suggested in Figure 7.

Having thus described my invention, what I claim as new is:

1. In a variable speed transmission having a drive shaft, a rear axle, differential gearing and case therefor, fixed pinions on the drive shaft, and inner and outer bevel gears mounted on the case of the differential gearing for rotation therewith, and for sliding movement relative to one another and to the case for movement into and out of mesh with the pinions, a shifting device for said double gears comprising a fixed drum in alignment with one end of the differential case, inner and outer pairs of cam rings, the inner pair of cam rings being arranged interiorly of the drum and including a ring free to rotate within the drum, and a second ring mounted for axial shifting movement toward and away from the inner beveled gear for shifting the latter into engagement with one of said pinions, said outer pair of cam rings also including a cam ring mounted for rotation relative to the drum, and a second cam ring mounted for axial shifting movement toward and away from the outer beveled gear for moving the latter into engagement with a second one of said pinions, and means for rotating the rotatable cam rings of said pairs to selectively engage the beveled gears with the pinions.

2. In a variable speed transmission including, a drive shaft, pinions on the drive shaft, a rear axle and differential gearing and case therefor, and concentric beveled gears located on the case of the differential gearing for rotation with the case and for sliding movement relative to the case and to one another; a gear shifting device at the side of the bevel gears opposite to the pinions to selectively interengage said gears and pinions, a fixed flange on the gear case at the side of the gears opposite to the gear shifting device, a series of spring pressed plungers carried by each of the beveled gears and mounted for axial shifting movement on said gears, and a series of arcuate levers fulcrumed on said flange, said levers having ends engaged with the plungers and coacting therewith to act on said gears in opposition to the gear shifting device to assist in the moving of one of said bevel gears out of engagement with its pinion upon operation of the gear shifting device to move the other of the bevel gears into engagement with its pinion.

3. In a transmission gearing including a divided shaft, a differential mechanism intermediate the sections of said divided shaft, a driving shaft, a series of pinions secured to said driving shaft, and a series of gears axially movable with reference to the divided shaft; a rotary means for axially moving either of said gears including circumferentially spaced spring pressed plungers mounted on each of said gears, a flange on the casing of the differential mechanism, and a series of arcuate levers pivotally mounted on the flange, each lever at one end thereof engaged with a plunger on one of the gears, and a relatively opposite end thereof engaged with a plunger on the other of said gears.

4. For use with a variable speed transmission including, a divided shaft, a differential mechanism and a flange equipped case therefor intermediate the sections of said divided shaft, a drive shaft, a series of pinions secured to the drive shaft, and a series of gears borne upon and axially shiftable with reference to the divided shaft; a rotary means having bearing engagement with one side of said gears for axially moving said gears and means at the side of said gears opposite to said rotary means and associated with said gears in a manner to act thereon in opposition to the rotary means to assist in the moving of said gears simultaneously in reverse directions relative to one another.

5. For use with a variable speed transmission gearing including, a driven shaft, and a series of gears borne upon and axially movable with reference to the driven shaft; a fixed annular member concentric to the driven shaft, a pair of cam rings arranged interiorly of the annular member and including a ring free to rotate relative to the annular member, and a second ring mounted for axial shifting movement toward and away from one of said gears for shifting the latter, an outer pair of cam rings borne upon said annular member and also including a cam ring mounted for rotation relative to said annular member, and a second cam ring mounted for axial shifting movement toward and away from a second one of said gears for shifting the latter, and means for rotating the rotatable cam rings of said pairs.

FRANK E. WEILAND.